United States Patent Office.

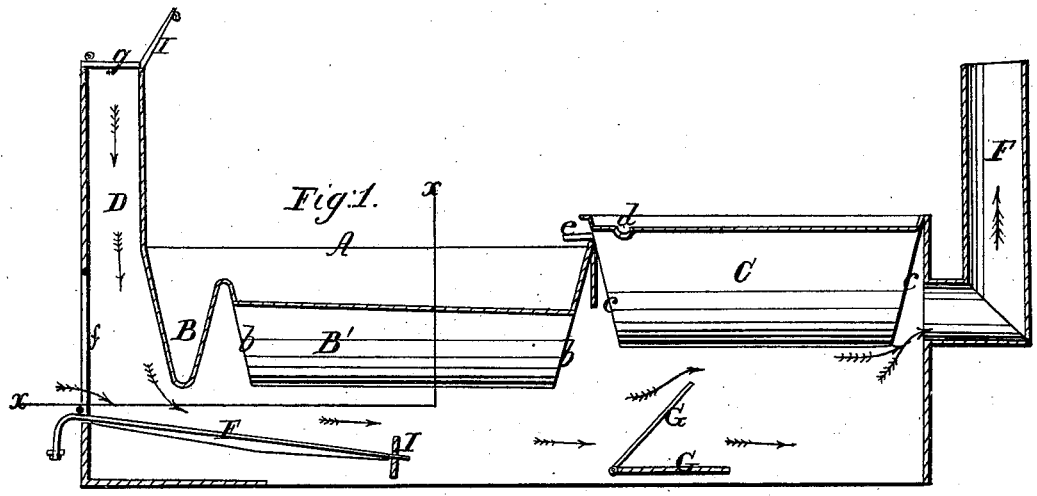
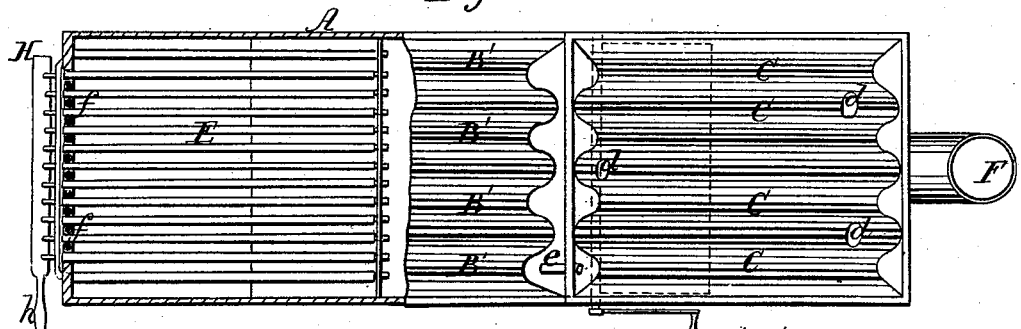
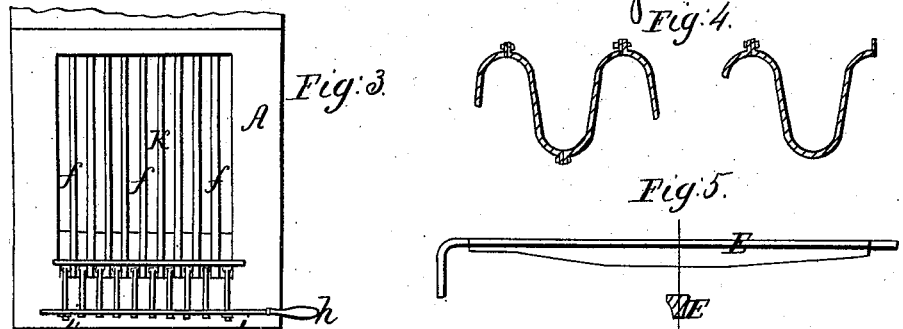
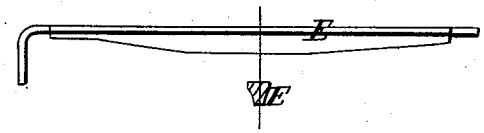

JOB A. DAVIS, OF WATERTOWN, NEW YORK.

Letters Patent No. 93,066, dated July 27, 1869.

---

IMPROVED APPARATUS AND PROCESS FOR THE MANUFACTURE OF SALT.

---

The Schedule referred to in these Letters Patent and making part of the same.

---

*To all whom it may concern:*

Be it known that I, JOB A. DAVIS, of Watertown, in the county of Jefferson, and State of New York, have invented an Improved Process and Apparatus for Purifying and Evaporating in the Manufacture of Salt, &c.; and I do hereby declare that the following, taken in connection with the drawings which accompany and form part of this specification, is a description of my invention sufficient to enable those skilled in the art to practise it.

My improvements relate to apparatus suitable for evaporating the water of brine in the manufacture of salt, or for evaporating the water from the cane (or other) juice in the manufacture of sugar, or for similar purposes, where it is required to separate the material held in solution from the liquid in which it is dissolved.

They consist in a new process, and in a means or apparatus for practising such process, hereinafter more fully set forth; and I shall describe them as applied to the manufacture of salt from brine, for which I have more particularly designed them, although applicable, also, to other kindred purposes.

Heretofore, in the salt-manufacture, the practice has been to supply the ordinary kettles with the cold brine, first properly prepared, and then by heating these kettles, or a series of them, to the requisite temperature, and for a sufficient period, the water is evaporated from the salt. But to this mode of treatment there are many and serious objections, among which may be enumerated the following, viz: the impurities are not removed, but remain with the salt; the frequent emptying of each kettle of its contents, and filling it with cold brine, involves a great loss of heat and fuel, and damages the kettles; there is no regular or even temperature preserved in the series of kettles; there are no means in the apparatus employed for removing any of the impurities before the brine is put into the evaporating-kettles; there are no means for concentrating and utilizing the bulk of the heat generated by the furnace, or of applying it so that a greatly-increased heating-surface is obtained, without any increase in the consumption of fuel.

Now, to remedy these and other existing defects, my improved process consists in purifying the brine by heating, and then supplying the evaporating-kettles with this already-heated and purified brine, the heat for both purposes being supplied from the same furnace or heating-apparatus; and my improved apparatus consists in an evaporating-kettle, so constructed and applied as to serve also as a fire-back to the fire-chamber; in an evaporating-kettle constructed with deep longitudinal corrugations, troughs, or hollow ribs or chambers, for receiving and holding the brine, and for receiving and concentrating the heat on the under side; also, in purifying-kettles, having similar ribs or chambers, and communicating-passages, to give a long route or passage from the first to the last of such chambers, and an outlet, to discharge the brine into the next in series of the purifiers, or, into the evaporating-kettles; and in certain details of construction hereinafter described.

Figure 1 represents a longitudinal section of a base-burning furnace, with my improvements applied thereto.

Figure 2 is a top view of the same, partly in section, as indicated by the lines $x\,x$, in fig. 1, in order to show the construction of the grate.

Figure 3 is a front view of the furnace and the grate-bars, and the means for rocking the latter.

Figure 4 represents modifications in the mode of constructing the evaporating and purifying-kettles.

Figure 5 represents a side view, and also a central cross-section of one of the grate-bars.

A is a furnace, made of sufficient length to contain the evaporating-kettles B B′, and a series of sets of purifying-kettles or chambers, C, one set only of the latter being exhibited in the drawing.

D is a feed-chamber for fuel.

E is the grate, and

F, the smoke-pipe.

G is a hinged or swinging deflector, such as I use to vary the current of the hot air passing from the fire and beneath the vessels B′ or C.

H is a rod connecting the grate-bars, and

I, a cross-bar, in which the rear ends of the grate-bars rest, so as to be rocked, and also to be withdrawn when desired.

K represents a series of fixed rods or bars, $f$, forming the front of the fire-chamber of the furnace.

L is a hinged or movable top or cap to the feed-chamber D.

The evaporating-trough, or kettle or kettles B, as well as the evaporating-kettles B′, and the purifying-kettles C, I make of cast-iron, or other suitable metal adapted for the special purpose in view, and of about the form shown in cross-section, in fig. 1, the kettle B being so located that one side of it forms the fire-back of the fire-chamber, thus not only superseding any brick-work at that point, but greatly economizing and utilizing the heat, which thus acts at once and almost directly upon the brine contained in B. This kettle may also, if desired, extend around both ends as well as across the back of the fire-pot, thus still further economizing and utilizing the heat generated. It should preferably be made distinct from the longitudinally-ribbed or corrugated kettles B′ B′, and should be made so as to be removable as readily as any ordinary kettle.

The kettles B′ B′, I make of similar form with B, in cross-section, and either make the whole of them in one piece, or, for greater facility of substitution and repair, in sections, somewhat as shown in fig. 4, the sections being bolted or secured together, their ends being closed by cross-castings or pieces $b\ b$. This construction, and the placing of the ribs or troughs as shown, lengthwise of the furnace, gives not only a very great heating-surface, in proportion to the size of the furnace and quantity of brine to be evaporated, but also concentrates and compacts the heat into the arched passages through which it must go in its course through the apparatus.

The purifying-troughs C are in construction similar to the kettles B', but they are placed at a higher elevation, that they, or rather the last of the set, may discharge their contents so as to supply these kettles with purified brine; and each compartment C of each set has a channel, $d$, at one end, communicating with the top of the next compartment, these channels being so located alternately, first at one end and then at the other, as to cause the brine which is being purified to take the slowest and most circuitous route possible, before being discharged into the next set of purifying-kettles, or into the evaporating-kettle or kettles, as the case may be, thus insuring the deposit into the removable pans, (not necessary to be shown,) which are placed at the bottom of the purifying-troughs, of the impurities with which the brine is more or less charged, such pans being from time to time, as may be needful, lifted from the troughs and emptied. The purifying and evaporating-kettles need not be removed, except for repairs.

Each set of purifying-troughs has an inlet, by which brine is supplied to the first of its series of troughs, and an outlet, as shown at $e$, by which it discharges the purified brine, the thoroughness of the purification varying with the number of purifiers employed; and a strainer is preferably placed over each outlet-pipe, to prevent impurities passing to the next purifier or kettle.

When the brine is being heated, these inlets and outlets are stopped, by any stop-cock or appropriate device, until it is heated to the desired or ascertained proper temperature, (a thermometer being appropriately used for this purpose,) after which a constant flow is kept up, sufficient to supply the evaporating-kettles. In the latter, the liquid is allowed to rise above the tops of the ribs or corrugations, the sides and ends of the compartment containing them being made high enough above them to allow of this, thus affording a larger evaporating-surface for the brine or other material.

It will be observed that the front gratings $f$ are fixed, and that there is no door capable of being opened immediately near the burning fuel. In this way I avoid the sudden reduction of heat of the fire, incident to all stoves or furnaces whose doors are frequently opened for the supply of fuel, and for other purposes, the fuel, in my apparatus, being supplied at $g$, the covering of which may be closed as desired.

While, by means of the handle $h$, the bars of the fire-grate may all be rocked upon their separate bearings, the removable nuts $i\ i$ afford a provision by which any or all of the bars may be removed for substitution or repair. The grate-bars are preferably made flat on their tops, and narrower on their under side, as seen in cross-section, in fig. 5, the latter feature preventing any clogging with coal, cinders, &c., and readily freeing the interspaces, when the grate is riddled by means of handle $h$.

I claim—

1. The process, substantially as described, of purifying and evaporating, by supplying the evaporating-kettles with the liquid already heated and purified, by means of the same heater which heats such kettles.

2. An evaporating-kettle, so constructed and applied as to serve also as a fire-back to the fire-chamber, substantially as described.

3. An evaporating-kettle constructed with longitudinal corrugations or hollow ribs, for receiving heat, and corresponding ones for containing the liquid to be evaporated, substantially as described.

4. A purifying-kettle having corrugations or ribs, as last named, and communicating-channels, to give a long route or passage from the first to the last chamber thereof, and a discharging-outlet, substantially as described.

5. The combination of the fixed grating $f$ with the movable grate-bars, arranged to receive a rocking motion in their bearings, substantially as described.

6. The combination of the adjustable heat-deflectors G with the corrugated troughs, substantially as described.

7. The construction, in an evaporating-apparatus, of the fire-chamber and its feed-chamber, so that the fuel may be supplied without opening any door directly admitting cold air to the ignited fuel, substantially as described.

J. A. DAVIS.

Witnesses:
JOHN J. HALSTED,
FRANK HAMILTON.